United States Patent [19]

Shiobara

[11] Patent Number: 5,414,813
[45] Date of Patent: May 9, 1995

[54] DIRECT TRANSFER FROM A RECEIVE BUFFER TO A HOST IN A TOKEN-PASSING TYPE NETWORK DATA TRANSMISSION SYSTEM

[75] Inventor: Yasuhisa Shiobara, Tokyo, Japan

[73] Assignee: Kabushiki Kaisha Toshiba, Kawasaki, Japan

[21] Appl. No.: 144,491

[22] Filed: Nov. 1, 1993

Related U.S. Application Data

[63] Continuation of Ser. No. 653,290, Feb. 11, 1991, abandoned.

[30] Foreign Application Priority Data

Feb. 13, 1990 [JP] Japan ............................. 2-32108

[51] Int. Cl.$^6$ .............................................. G06F 13/00
[52] U.S. Cl. ............................ 395/200; 364/DIG. 1; 364/241.8; 364/242.94; 364/DIG. 2; 364/940.8; 395/275
[58] Field of Search ............... 395/200, 275; 370/60; 340/825; 364/200, 900

[56] References Cited

U.S. PATENT DOCUMENTS

| | | | |
|---|---|---|---|
| 3,979,733 | 9/1976 | Fraser | 364/200 |
| 4,424,565 | 1/1984 | Larson | 364/200 |
| 4,547,850 | 10/1985 | Genma | 364/200 |
| 4,590,468 | 5/1986 | Stieglitz | 340/825.5 |
| 4,672,543 | 6/1987 | Matsui et al. | 364/200 |
| 5,001,472 | 3/1991 | Fischer et al. | 340/825.5 |
| 5,020,020 | 5/1991 | Pomfret et al. | 364/900 |
| 5,095,480 | 3/1992 | Fenner | 370/94.1 |
| 5,136,580 | 8/1992 | Videlock et al. | 370/60 |
| 5,168,496 | 12/1992 | Ohba | 370/85.14 |

FOREIGN PATENT DOCUMENTS

| | | |
|---|---|---|
| 2620220 | 11/1976 | Germany . |
| 3331233 | 3/1984 | Germany . |
| 648501 | 2/1989 | Japan . |
| 1157143 | 6/1989 | Japan . |

*Primary Examiner*—Christopher B. Shin
*Attorney, Agent, or Firm*—Oblon, Spivak, McClelland, Maier, & Neustadt

[57] ABSTRACT

A data transmission system using media access control of a token-passing type including multiple nodes connected to a common transmission path, wherein each node transmits data in a predetermined period in order in a broadcasting or multicasting manner, and each non-transmitting node receives and stores the data in a receive buffer. Each node includes circuitry for receiving a data frame and detecting whether or not a destination address included in the received data frame is the same as its own destination address, and transmitting a data frame reception end signal when it is determined that its own destination address has been received. A DMA controller extracts predetermined received data included in the received data frame in response to the data frame reception end signal and transmits the predetermined received data to a receive buffer where the predetermined received data are stored. An address conversion memory stores an address of the received data stored in the receive buffer, and converts a specific address externally input to access the received data in the receive buffer into the address of the receive buffer at which the received data is stored, thereby generating a conversion address. A receive and transmission control processing circuit updates the address of the received data stored in the receive buffer, causes the updated address to be stored in the address conversion memory, and accesses the received data in the receive buffer with the conversion address to read out the received data.

9 Claims, 7 Drawing Sheets

| IN2 VALUE \ IN1 VALUE | 0 | 1 | 2 | 3 | 4 | ----- | 30 | 31 |
|---|---|---|---|---|---|---|---|---|
| 0 | 0,0 | 0,1 | 0,2 | 0,3 | 0,4 | ----- | 0,30 | 0,31 |
| 1 | 0,1 | 0,2 | 0,3 | 0,4 | 0,5 | ----- | 0,31 | 1,0 |
| 2 | 0,2 | 0,3 | 0,4 | 0,5 | 0,6 | ----- | 1,0 | 1,1 |
| 3 | 0,3 | 0,4 | 0,5 | 0,6 | 0,7 | ----- | 1,1 | 1,2 |
| 4 | 0,4 | 0,5 | 0,6 | 0,7 | 0,8 | | 1,2 | 1,3 |
| ⋮ | ⋮ | ⋮ | ⋮ | ⋮ | ⋮ | ⋮ | ⋮ | ⋮ |
| 29 | 0,29 | 0,30 | 0,31 | 1,0 | 1,1 | ----- | 1,27 | 1,28 |
| 30 | 0,30 | 0,31 | 1,0 | 1,1 | 1,2 | ----- | 1,28 | 1,29 |
| 31 | 0,31 | 1,0 | 1,1 | 1,2 | 1,3 | ----- | 1,29 | 1,30 |

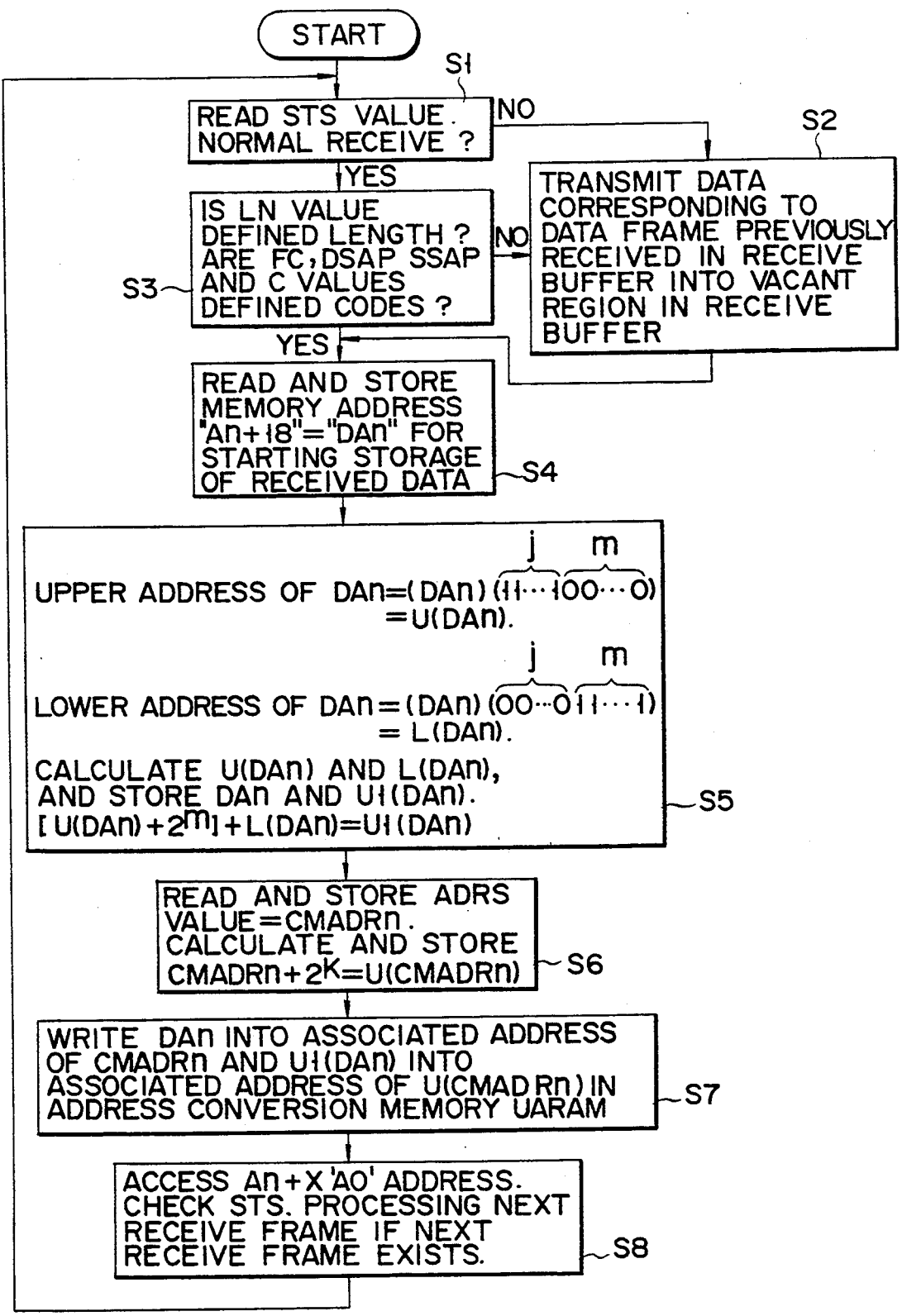
F I G. 10

DIRECT TRANSFER FROM A RECEIVE BUFFER TO A HOST IN A TOKEN-PASSING TYPE NETWORK DATA TRANSMISSION SYSTEM

This application is a continuation of application Ser. No. 07/653,290, filed on Feb. 11, 1991, now abandoned.

BACKGROUND OF THE INVENTION

1. Field of the Invention

The present invention relates to a received-data processing system for use in a data transmission system, LAN (Local Area Network) and the like in which computers or various control apparatuses distributed in different locations are mutually connected by a common transmission path for mutual data exchange. More particularly, this invention pertains to a received-data processing system capable of improving the data transmission rate.

2. Description of the Related Art

Today, due to the development of factory automation, there is a tendency of constructing a high-function, high-performance continuous process control system which has intelligent machines, such as a computer, PC (Programmable Controller), and DCS (Distributed Control System), connected to a common transmission path to build a network, exchanges information, such as production information including a manufacturing entry and product result, manufacturing program data and process control data, and monitor data, among these multiple machines, and executes decentralized control and supervisory control of the entire system. This type continuous process control system shares the supervisory data and control data which are to be exchanged among multiple machines, thus ensuring efficient decentralized control in individual machines and supervisory control of the entire system.

A typical data transmission system employed in information exchange among individual machines is a one-to-one type in which each machine transmits information while personally specifying another machine and acknowledges the reception of information from the destination. Due to the troublesome procedures and delayed processing speed, however, this one-to-one data transmission system has recently been replaced with a broadcasting or multicasting data transmission system, i.e., a data transmission system of a broadcast type. In this broadcast type data transmission system, each machine periodically transmits data and other machines receive the periodically on-coming monitor/control data. The monitor/control data is stored in a common memory having a specific memory address common to the individual machines, renewing the latest data. High-speed and effective N-to-N type information exchange is executed in this manner, and decentralized control for each machine and the supervisory control of the entire system are realized. Examples of such a data transmission system are a data transmission system as disclosed in Published Examined Japanese Patent Application No. 64-8501 and a network system employing a token-passing bus system as disclosed in Published Unexamined Japanese Patent Application No. 1-157143.

Referring to FIG. 1, the construction of a LAN system to be employed in the conventional continuous process control system will be described below. In this system, multiple nodes $1_1$ to $1_n$, such as control machines, are connected at proper intervals to a common transmission path L. These nodes $1_1$-$1_n$ each have a common memory CM incorporated. A node having an authorization to use the transmission path broadcasts or multicasts the necessary information within a predetermined period of time, and gives the authorization to the next node upon each passage of the predetermined period of time. In other words, this system uses a media access control system. Although a loop network is constructed in FIG. 6, there may be a bus network having individual nodes $1_1$-$1_n$ connected in a bus form, or a star network having the nodes connected in a star form.

The media access control systems include IEEE (Institute of Electrical & Electronics Engineers) 802.5 system to be applied to the loop network, an FDDI system standardized by American National Standards Institute (ANSI), IEEE 802.4 to be employed in the bus or star network and standardized by the IEEE. All of these systems are a token-passing type in which individual nodes exchange a frame called "token" with one another to give the transmission right to a proper node, so that multiple nodes do not simultaneously have the transmission permission at the same point of time. The node having received the token transmits data within a predetermined period of time. From the total number of nodes and the set times for the individual nodes, therefore, each node can therefore compute the maximum time that it has to wait to transmit data. Further, the individual nodes can surely send data in accordance with the predetermined order, and can surely access the transmission path.

In the LAN system shown in FIG. 1, each of the nodes $1_1$ to $1_n$ broadcasts or multicasts a data frame, including its own output data as shown in FIG. 2, to the other nodes. Referring to FIG. 2, PA is a preamble, SSAP is a source service access point, SD is a start delimiter, FC is frame control, DA is a destination address, SA is a source address, DSAP is a destination service access point, C is an information command, WN is an information word number, $DATA_0$-$DATA_n$ are data, and FCS is a frame check sequence.

When the other nodes receive a data frame intended for the respective node, the data frame is stored at a specific common memory address in the common memory CM. The node having the authorization to use the transmission path gives the token frame to the next node when a predetermined period of time is elapsed. The node receiving this token frame has the right to use the transmission path for a predetermined period of time, and likewise transmits the data frame. Accordingly, all the nodes $1_1$-$1_n$ share the same data in the common memory CM. FIG. 3 illustrates one example of a train of frames on the transmission path, which are transmitted by the individual nodes $1_1, 1_2, \ldots, 1_n$ in the order of the data frame $DF_1$ followed by the token frame TK, $DF_2$ followed by the token frame TK, and so forth, within a predetermined transmission period T.

The nodes $1_1$-$1_n$ each have the hardware configuration as shown in FIG. 4. When one node having the authorization to use the transmission path, for example, the node $1_1$, transmits the data frame shown in FIG. 2, each of the other nodes $1_2$-$1_n$ receives the data frame at a transceiver circuit 21 and sends a received output 22 to a token passing receive and transmission control circuit 23. The control circuit 23 in each node checks the DA field in the received data frame to determine whether or not the received data is intended for that node. More specifically, if the node designating address, broadcasting address or multicasting address in the DA field in the data frame designates that node as the addressee, the control circuit 23 determines that the received data is intended for that node, and fetches the data frame in. When the control circuit 23 completes the reception of the data frame, a DMA (Direct Memory Access) control circuit 24 extracts the received data in the fields from the FC field to FCS field from the data frame, and stores the data in a receive buffer 25. At this time the received data is stored in the receive buffer 25 as shown in FIG. 5A or 5B. FIG. 5A illustrates the stored status of the receive buffer 25 in the case of the proper or normal data reception, and FIG. 5B the stored status of the buffer 25 when there is a reception error. In either case, the field length of the received data is "64." In these diagrams, STS (Status) is status information which indicates whether the reception has properly completed or a reception error has occurred, and LN (Length Number) represents the total quantity of data stored in the receive buffer 25.

A receive and transmission control processor 26 processes the received data upon reception of a data frame reception end signal 27. The processing of the received data is to Judge if the DSAP field, SSAP field and C field in the received data stored in the receive buffer 25 match with designated values. If matching is made, the WN field indicating the total quantity of data in the received data field and the ADRS (Address) field indicating the start memory address to store data in the common memory 28 are read out, and the WN value and ADRS value are set in the DMA control circuit 24. The DMA control circuit 24 in turn transfers received data $DATA_0$ to $DATA_n$ in the receive buffer 25 to the common memory 28. The data stored in the common memory 28 is read out via a interface circuit 30 and utilized by a host equipment 29, such as a computer, PC or DCS. It is to be noted that a common bus memory control circuit is also provided, though not shown.

In FIG. 4, B1 is a buffer memory bus including a buffer memory data bus $B1_1$ and a buffer memory address bus $B1_2$, B2 is a common memory bus having a common memory data bus $B2_1$ and a common memory address bus $B2_2$, and B3 is a host system bus.

In the above-described received-data processing system, after the received data frame is temporarily stored in the receive buffer 25 to complete the data reception, the values in the WN field and ADRS field in the frame are read out, and are transferred in DMA transmission to the associated address in the common memory 28 or the last storage section.

According to the conventional received-data processing system, therefore, there are the receive buffer 25 and the common memory 28 physically different from each other. Since the data frame is temporarily stored in the receive buffer 25, then finally stored in the common memory 28, data should be transferred from the former memory 25 to the latter memory 28. This results in longer time to process the received data, and thus restricts the data transfer performance of the entire system.

Even if one tries to increase the data transmission rate of the network system to enhance the transmission performance, the processing time involved in transmitting received data determines the data transfer performance of the common bus 33 between the receive buffer 25 and common memory 28. Improving the data transmission rate to some extent to enhance the transfer performance will therefore require complex hardware. In this case, there is also a limit to the performance.

SUMMARY OF THE INVENTION

It is therefore an object of the present invention to provide a received-data processing system which can considerably shorten the time to transmit received data, and improve the data transfer rate of the whole system as a consequence.

To achieve this object, according to the present invention, data coming from each node is stored in a receive buffer, and in processing the received data, it is checked if the data reception is normal from the status information, STS, the total quantity of data stored in the buffer, LN, and other information stored in the receive buffer. In the case of normal reception, the start memory address $DA_n$ to store the received data is read out from the receive buffer. Based on this $DA_n$, the upper address and lower address are calculated, and a carry is then acquired. The necessary address value is stored in an upper address generating memory of address conversion memory means for address updating. Thereafter, the renewed address of the receive buffer in the upper address generating memory is put together with a common memory address to access a lower address generating memory. When a carry is needed, the upper address is generated again from the upper address generating memory while giving a carry command to the upper address generating memory from the lower address generating memory, then a conversion address is generated from the finally settled upper and lower address generating memories. Data is read out from the receive buffer using this address to execute the same process as reading data from a virtual common memory having a specific memory address common to the entire system. The received data of each node can be utilized without involving data transfer between the receive buffer and common memory.

In the case of abnormal reception, of the latest data received in the previous period or valid data received in the past, which is stored in each unit capacity memory, the data of the associated node is transferred to the data area of this node which is presently receiving the received data, and the reception process is executed in the above-described manner.

As described above, the present invention produces various effects presented below.

First, the time to transmit received data can be considerably shortened, and the data transmission rate of the whole system can be improved as a consequence. This feature is effective particularly when the traffic on a common transmission path is very heavy or data is continuously received.

Then, the output data of each node can surely be stored and correct data can be always stored in the receive buffer, thus ensuring that correct data be surely read out by specifying a common memory address from a host equipment.

Further, the carry process at the time of address conversion can be executed easily and promptly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 10 is a diagram illustrating procedures of processing received data.

DETAILED DESCRIPTION OF THE PREFERRED EMBODIMENT

Before describing a preferred embodiment of the present invention referring to the accompanying drawings, fundamental matters to realize the system of the present invention will be explained.

According to a network system of this type, to permit each node to send its own data in a predetermined order, the output data of the other nodes are periodically stored in order in the receive buffer of each of the other nodes, starting with the output data of a certain node. The order may be disturbed when a reception error occurs or when an extra data frame other than output data generated in response to a sudden data request from a certain node is received. Therefore, when the reception error occurs, for example, the data should be replaced with the previous correct data in one scan cycle or other valid data.

Considering what is described above, in order to transfer the received data in the receive buffer without transferring it to a common memory, the correct data in the receive buffer should appear equivalent to the one in the common memory which is conventionally the last storage area. For this purpose, the received data needs to be read out while associating the memory address of the receive buffer data actually stored in the receive buffer with the address of the conventional common memory through some address conversion. Then, though having no common memory, a host equipment can use the received data effectively as if it had the common memory.

Figure 4:
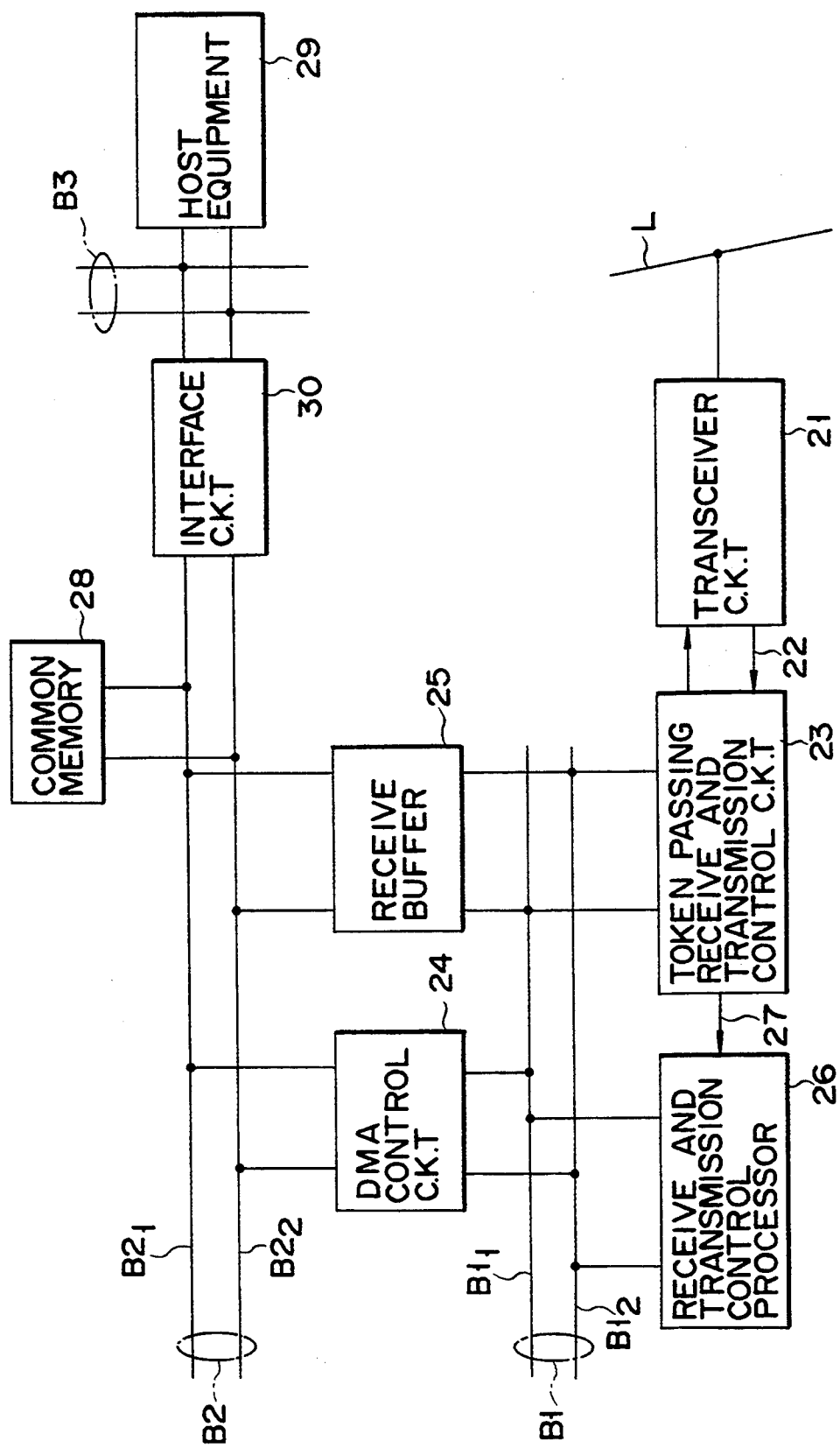
FIG. 4 is a block diagram of each conventional node.
Figure 6:
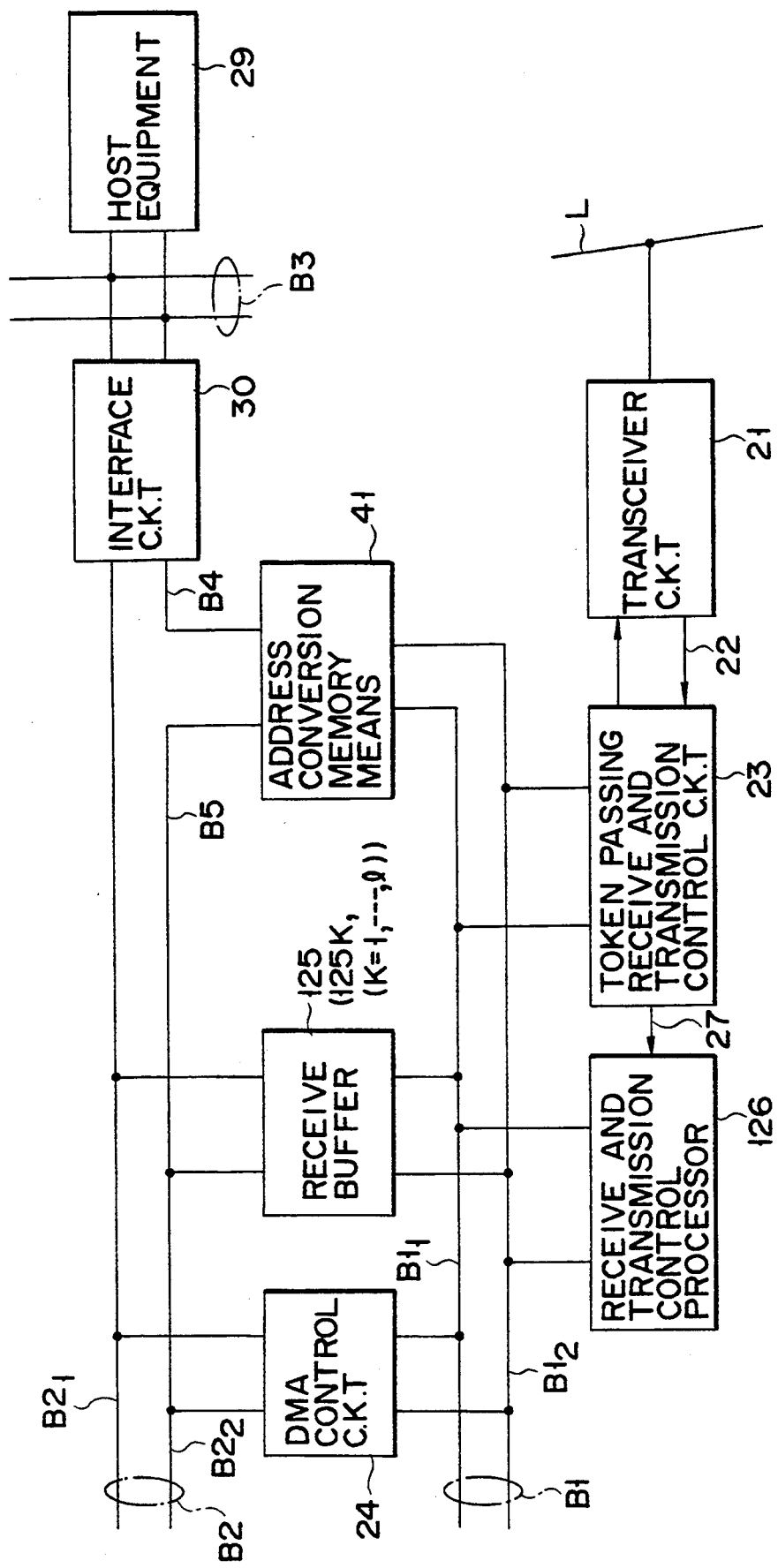
FIG. 6 is a block diagram of each node according to the present invention.
Figure 7:
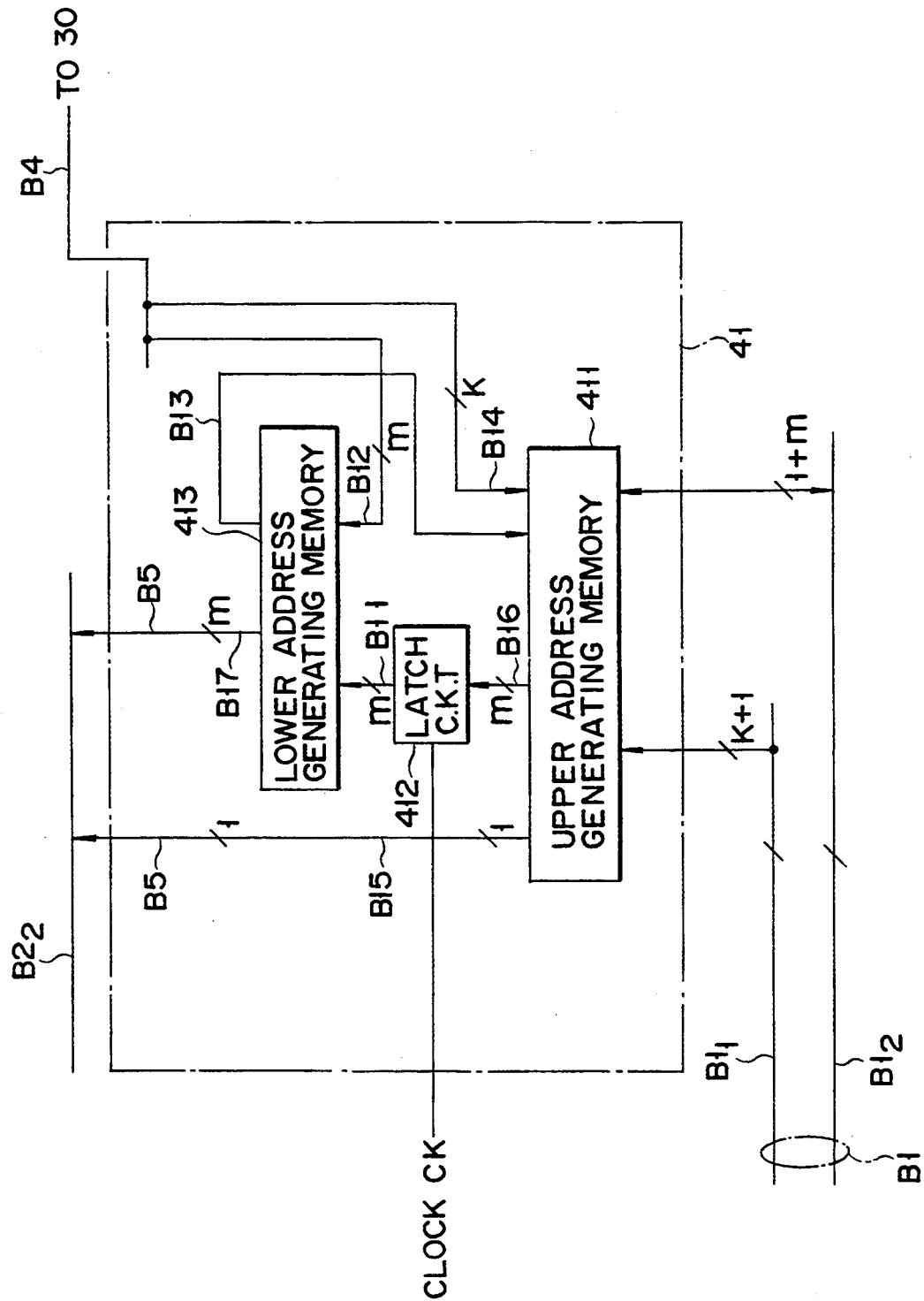
FIG. 7 is a block diagram illustrating address converting memory means which is newly added according to the present invention.
Figures 8, 9:
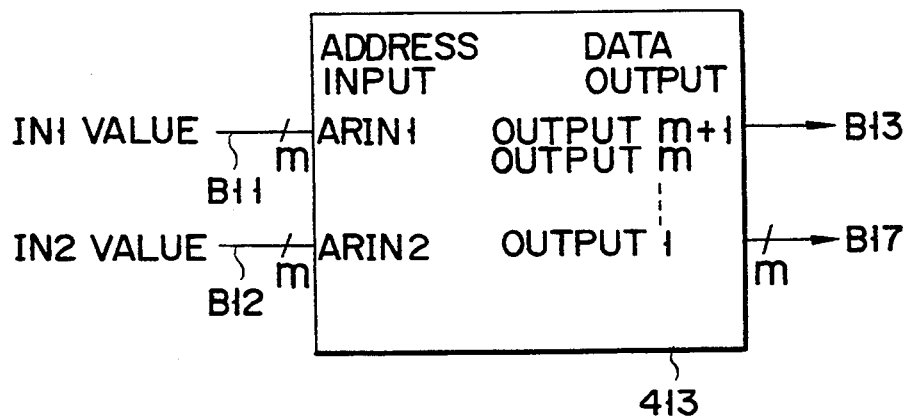
FIG. 8 is a diagram illustrating the signal input/output for a lower address generating memory shown in FIG. 7.
FIG. 9 is a diagram exemplifying the programming of the lower address generating memory.

One embodiment of the present invention will now be described referring to FIGS. 6 to 10. FIG. 6 shows the hardware structure of the nodes in the system of the present invention; FIG. 7 shows the structure of address conversion memory means newly added in the present invention; FIG. 8 shows the signal input/output status of lower address generating memory shown in FIG. 7; FIG. 9 exemplifies the programming of the lower address generating memory; and FIG. 10 presents the procedures of processing the received data. The sections in the drawings corresponding to those in FIG. 4, showing the conventional node, are given the same reference numerals, thus omitting their detailed explanation.

The nodes in the system of the present invention each have no conventional memory 28, while they newly have a dual-port receive buffer 125, an improved version of the conventional receive buffer, and address conversion memory means 41 of a dual port memory type. A receive and transmission control processor 126 has functions of a receive and transmission control processor 26 and additional functions as will be described later. A common memory bus control circuit (not shown) is provided in the same manner as in the conventional.

The receive buffer 125 includes multiple unit capacity memories 125k (k=1 ... l) which each have a unit capacity equivalent to the amount of received data of the whole system in one scan period (one transmission period T). These unit capacity memories 125k are alternately used to sequentially store the received data in each scan period for data renewal. The reason for the provision of the multiple memories 125k is to secure an empty area as needed even if the data reception progresses. More specifically, these unit capacity memories 125k are used to alternately store presently-received one-scan period data (present data) and the latest scan data (previous data) received in the previous one-scan period, as well as valid one-scan data (previous valid data) received in the past, or the next one-scan period data (next data) in the named order. This process requires at least three unit capacity memories 125k. When four unit capacity memories 125k are to be used, the valid one-scan data received in the past (previous valid data) and the next one-scan period data may be separately stored.

With the above structure, upon reception of a data frame including an error within one scan period, the data stored in the unit capacity memory 125k, such as the previous valid data, has only to be transferred to the empty area in the unit capacity memory 125k of the previous value, while writing the address of the transferred data in the memory of the address conversion memory means 41. Further, upon detecting that the network system is abnormal, or upon occurrence of erroneously received frames equal in number to or greater than expected, data transfer to the unit capacity memory 125k of the previous data is stopped, and the previous valid data is left in the associated memory 125k. In other words, the remaining two unit capacity memories 125k have only to be used to receive data, and when an abnormal state returns to normal, the received data can alternately be stored in the individual unit capacity memories 125k.

Under the normal state, only two unit capacity memories 125k are used, so that at least two unit capacity memories 125k should be provided in this case.

Figure 1:
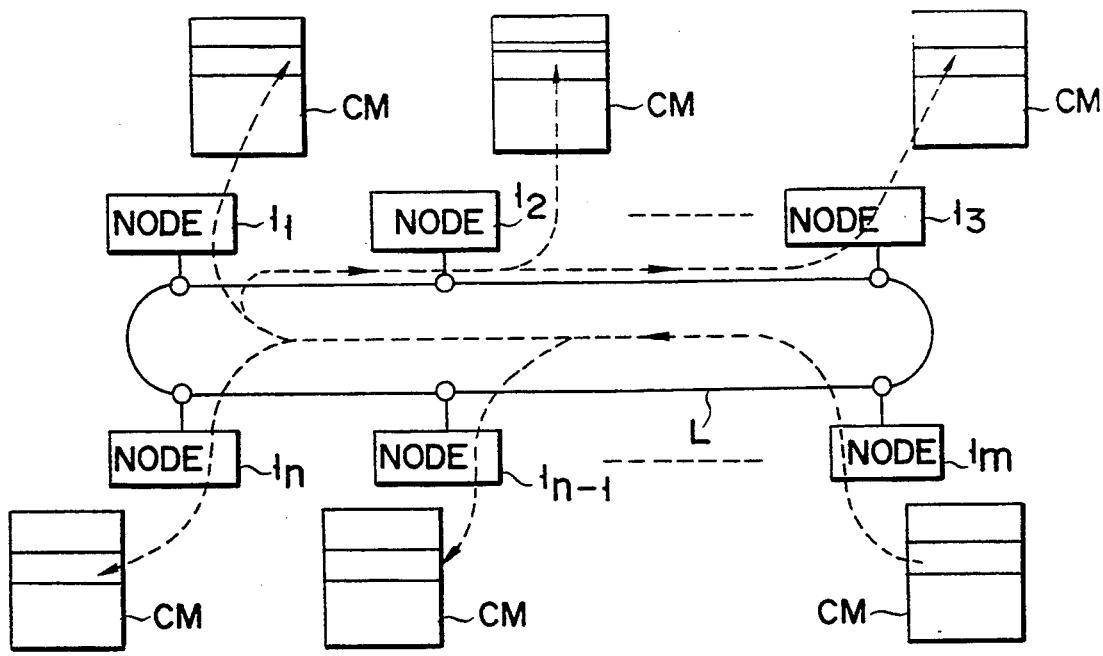
FIG. 1 is an exemplary diagram illustrating the structure of a general data transmission system.
Figure 2:
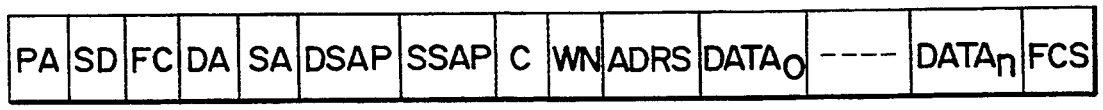
FIG. 2 is a diagram illustrating the format of a data frame.
Figure 3:
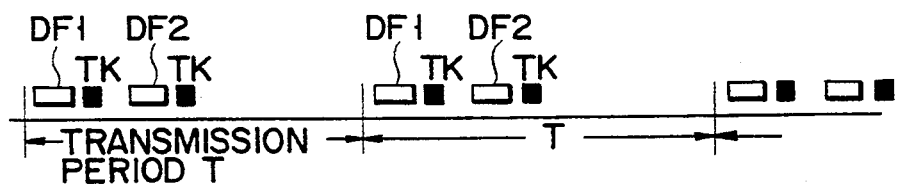
FIG. 3 is a diagram illustrating a train of frames in a transmission path.

The address conversion memory means 41 includes an upper address generating memory (RAM) 411, a latch circuit 412, and a lower address generating memory (ROM) 413. After reception of the data frame shown in FIG. 2 is completed, the address of a series of correct data stored in the unit capacity memories 125k in the receive buffer 125, which corresponds to the ADRS value read out as a start address ADRS in the conventional common memory from the ADRS field of the data, is written in the upper address generating memory 411 by the receive and transmission control processor 126. The start address in the receive buffer 125 is updated. Further, when a predetermined address in the unit capacity memories 125k is accessed by the host equipment 29, the upper address generating memory 411 generates the associated upper address. The latch circuit 412 latches the address of the unit capacity memories 125k which is generated from the upper address generating memory 411, using a clock ck. The lower address generating memory 413 receives the output of the latch circuit 412, and outputs the lower address of actual m bits. If a carry condition occurs, the lower address generating memory 413 returns the carry condition to the upper address generating memory 411 again to generate the upper address. The lower address generating memory 413 has the input/output relation as shown in FIG. 8; B11 is the output of the latch circuit 412, B12 is a lower address input which is sent through a host address bus input B4 on the side of the host equipment, B17 is a lower address output, and B13 is a carry command.

FIG. 9 shows an example of the programming of the lower address generating memory 413 for address conversion, indicating values (in a decimal system) to be programmed in the lower address generating memory 413 if the number of input signal lines, m, is five. A value IN1 is an address on the side of the receive buffer or the output B11 of the latch circuit, and a value IN2 corresponds to a common memory address on the side of the host equipment. When IN1 is "1" and IN2 is "0", the value to be programmed is "0, 1" and when IN1 is "1" and IN2 "31," the value is "1, 0." In the latter case, therefore, a carry is needed. In short, X in (X, Y) or the values of IN1 and IN2 represents a carry while Y is the lower address output B17.

A sequence of operations in the received data processing system according to the present invention will now be described. When a data frame having the format as shown in FIG. 2 is transmitted from a node having an authorization to use the transmission path, the other nodes receive this data frame in a transceiver circuit 1, and then send a reception output 22 to a token passing receive and transmission control circuit 23. The token passing receive and transmission control circuit 23 checks if the DA field in the received frame designates its own node, or whether the DA field is the broadcasting address or the multicasting address. When the control circuit 23 judges that the DA field in the data frame specifies its own node, the control circuit 23 fetches the data frame in. Then, a DMA control circuit 24 stores the received data from the FC field to the FCS field of the received data frame into the receive buffer 125 (unit capacity memories 125k) in the above-described manner illustrated in FIGS. 5A and 5B. It is therefore possible at this time to know from the status information STS if the reception is properly completed, or a reception error has occurred.

when the receive and transmission control processor 126 receives a data frame reception complete detect signal 27 from the token passing receive and transmission control circuit 23, it processes received data as shown in FIG. 10. The control processor 126 reads the value of status information STS from the receive buffer 125 and determines in step S1 whether or not the reception has normally occurred. When the reception error occurs in step S1, the flow moves to step S2. The control processor 126 stops processing the data frame, and sends a command to the DMA control circuit 24 so as to transfer data previously normally received in one scan period which corresponds to this node, to the unit capacity memory 125k which corresponds to presently received data used.

In the case of the normal reception, the flow advances to step S3. In this step S3, the LN value, FC field, DSAP field, SSAP field, C field and other necessary information are read out, and it is checked if the LN is a specified length, if the FC field, DSAP field, SSAP field and C field are specified codes, and if the necessary information is proper or not. If any of the above is not correct, the process illustrated in step S2 is executed. If all of the above checks are proper, the flow goes to the next step S4.

Figure 5A:
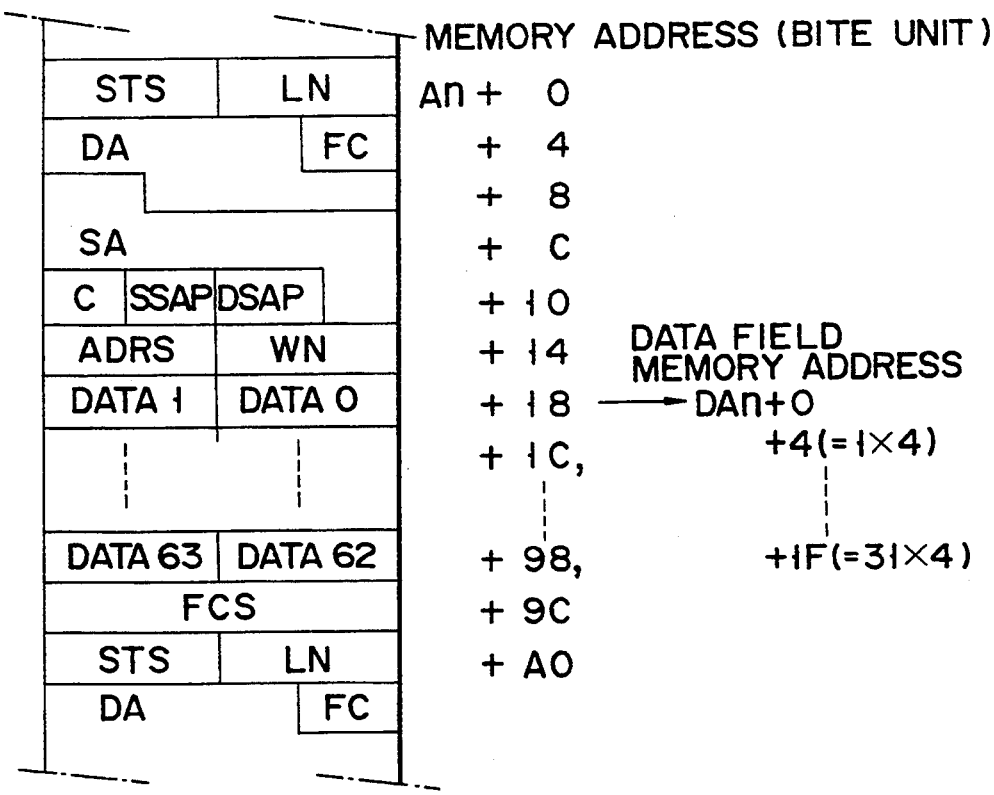
FIGS. 5A and 5B are diagrams illustrating how data is stored in a receive buffer.
Figure 5B:
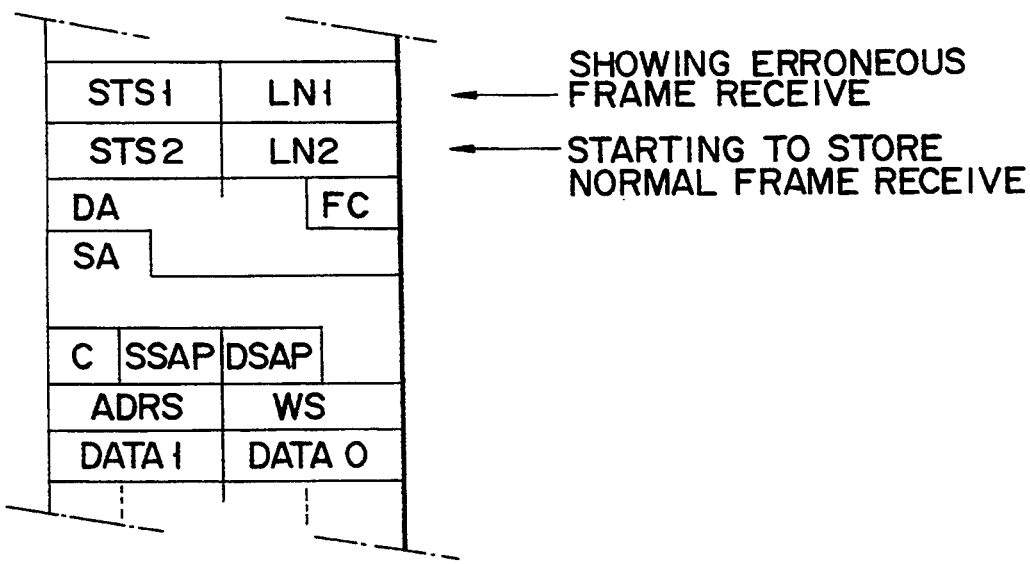

In step S4, the receive and transmission control processor 126 reads the receive buffer start address included in the received data, An+18 in FIG. 5A, as $DA_n$ value, and stores the value in a predetermined area in the receive buffer 125.

In the subsequent step S5, the control processor 126 reads out the $DA_n$ value from the receive buffer 125, and calculates the upper address U ($DA_n$) and lower address L ($DA_n$) from this $DA_n$ value. According to what is shown in FIG. 5A, the output data from each node is divided into data frames in units of m=5 or 32 long words, and is then transmitted in this form. When the 32 ($=2^5$) long word is consecutively read out from the receive buffer 125, starting with the start address $DA_n$, the lower address L ($DA_n$) is "0" for the 32-L ($DA_n$)-th data, and the upper address U ($DA_n$) has one carry.

The calculation of the upper address U ($DA_n$) is to compute the carry value of the upper address or the value 32 long word ahead from the start address in the receive buffer. The calculation of the lower address L ($DA_n$) is to compute from which memory location in the 32 long word, the data is consecutively stored, when m=5 bits (32 long word) are taken as one unit.

Based on the acquired upper address U ($DA_n$) and lower address L ($DA_n$), the receive and transmission control processor 126 calculates $$[U(DA_n+2^m)]+L(DA_n)=U1(DA_n)$$

then stores the resultant value in a predetermined area in the receive buffer 125.

In the subsequent step S6, the control processor 126 reads out the ADRS value indicating the storage start address in the unit capacity memory 125k (common memory) as ADRS value = $CMADR_n$ and stores it in a predetermined area in the receive buffer 125. Based on the $CMADR_n$, the control processor 126 also computes $CMADR_n + 2^i$ and acquires the address U ($CMADR_n$) of the unit capacity memory 125k. This address U ($CMADR_n$) is computed to generate the correct receive buffer address for the value U ($DA_n$) to have a carry when the unit capacity memory 125k addressed by the ADRS value with the 32 long word as a unit is accessed. Here, the value i varies in accordance with the capacity of the unit capacity memory 125k or the condition for the total quantity of data to be transmitted. For instance, if i=8 bits, these bits are added to the lower address length m=5 bits to provide a memory capacity for a 13-bit length. In this case, therefore, each unit capacity memory 125k has a capacity for an 8i long word.

In the next step S7, the control processor 126 writes the $DA_n$ value in the upper address generating memory 411 of the address conversion memory means 41 at an address corresponding to the $CMADR_n$ value, and writes the U1 ($DA_n$) value at an address corresponding to the U ($CMADR_n$) value when a carry occurs.

In step S8 the above processing is repeated for each received data frame.

In reading the content of the unit capacity memory 125k (common memory) in the host equipment 29, the address of the unit capacity memory to be read out is input via the interface circuit 30 and host address bus input B4 to the address conversion memory means 41. More specifically, the upper address input B14 is input to the upper address generating memory 411 while the lower address input B12 (IN2 value) is input to the lower address generating memory 413. Upon reception of the input B14, the upper address generating memory 411 outputs the address $DA_n$ of the receive buffer 125, which has been updated in the aforementioned step S7 in FIG. 10, as the upper address output B15, and sends the m-bit output B16 (m=5, for example) to the latch circuit 412. The latch circuit 412 latches the m-bit receive buffer address B16 (IN1 value) in response to the first clock ck, then sends the latched output B11 to the lower address generating memory 413. This memory 413 puts the latched output B11 and the lower address input B12 together, and outputs the lower address value B17 as shown in FIG. 9. When a carry condition is present, the memory 413 outputs a carry command B13 and sends it to the upper address generating memory 411.

This memory 411 outputs the address U1 ($DA_n$) of the receive buffer 125, which has been renewed in the aforementioned step S7 and corresponds to a carry, and sends it to the latch circuit 412. Likewise, the latch circuit 412 latches the address U1 ($DA_n$) in response to the second clock ck, then sends the latched address to the lower address generating memory 413. As a result, the actual memory address of the receive buffer 125 finally settled is output as the upper address output B15 and lower address output B17 to the common memory address bus $B2_2$, and the outputs B15 and B17 are used to read out data from the receive buffer 125.

In step S7, the lower address output B17 is settled at the timing of the first clock signal ck because the lower m-bit values of $DA_n$ and U1 ($DA_n$) to be written at address corresponding to $CMADR_n$ and U ($CMADR_n$) are the same. The generation of the upper address value therefore requires two clocks.

The address of the unit capacity memory, which is to be read out by the host equipment 29, is converted into a memory address of the receive buffer 125 by the address conversion memory means 41, and data is read out using this converted address.

According to the above-described embodiment, therefore, based on the reception start address, the address indicating the data storage status of the receive buffer 125 is stored in the address conversion memory means 41. Meanwhile, the common memory address from the host equipment 29 is input to the memory means 41. The memory means 41 performs address conversion of the address of the receive buffer 125 and the common memory address from the host equipment 29, and reads out data from the receive buffer 125 using the acquired addresses. It is therefore possible to read out data without a common memory, in the same manner as involving the common memory. As, unlike the prior art, data need not be transferred to the common memory from the receive buffer 125, the time for processing the received data can be shortened, improving the data transmission rate accordingly. This can enhance the data transfer performance as a consequence. Since the received data can be stored in the receive buffer 125 without interfering the access operation of the host equipment to the common memory, the data writing in the receive buffer 125 for data renewal can be executed at a high speed.

The receive buffer 125 has a memory capacity plural times larger than the capacity of a unit capacity memory which is equivalent to the amount of periodically-received data of the whole system. The unit capacity memories are used one at a time for each period to store presently-receiving data, latest data received in a previous period, and one or both of valid data received in the past and received data in a next period. In this manner, therefore, valid data can always be stored in the receive buffer 125. Even if data is read out with a common memory address specified by the host equipment, the normal data can surely be read out.

Further, the address conversion memory means 41 is separated into the upper address generating memory 411 and the lower address generating memory 413. In particular, the memory 413 puts the address of the receive buffer and the address of the common memory together and performs a carry operation based on the resultant data. The carry operation, which is always involved in address conversion of the actual address of the receive buffer 125 and the address of the common memory, can be facilitated without delay.

Although the foregoing description of the embodiment has been given with reference to a loop network, the present invention is not restricted to this particular type of network. For instance, this invention may be applied to a bus type network, type network and other types as well within the scope and spirit of the invention. The common transmission path L is not limited to an electric type, but may be of an optical or radio type as well.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data transmission system using media access control of a token-passing type, comprising:
multiple nodes each having a respective destination address and connected to a common transmission path, wherein each node transmits data in a predetermined period in order in a broadcasting or multicasting manner, and each non-transmitting node receives the data transmitted by the transmitting node, determines whether its respective destination address is designated in the received data, and if so, stores the received data;

wherein each node comprises, bus means for transmitting data and address signals, transceiver means for receiving a data frame over said common transmission path and transmitting the received data frame to an output of the transceiver means, token passing receive and transmission control means coupled to the output of the transceiver means for receiving said data frame, detecting a destination address included in said received data frame, determining whether or not the detected destination address corresponds to its respective destination address, outputting at an output of said token passing receive and transmission control means a data frame reception end signal when it is confirmed that a detected destination address corresponds to its respective destination address and then also outputting on said bus means the received data frame, DMA control means coupled to said bus means for extracting predetermined received data and corresponding address information included in said received data frame in response to said data frame reception end signal from said token passing receive and transmission control means, and transmitting said predetermined received data and corresponding address information on said bus means, receive buffer means coupled to said bus means for receiving and storing said extracted predetermined received data and corresponding address information transmitted by said DMA control means, address conversion memory means for storing an updated address of said received data stored in said receive buffer means, receiving an externally input specific address from a host to access the received data stored in said buffer means, converting said/-specific address and said updated address into a conversion address, and applying said conversion address to said receive buffer means to access corresponding received data and the corresponding address information stored in said receive buffer means; and receive and transmission control processing means coupled to said receive buffer means via said bus means for generating said updated address in correspondence to the received data and the corresponding address information stored in said receive buffer means as said received data is stored in said buffer means and causing the updated address to be stored in said address conversion memory means in correspondence to said received data stored in said buffer means.

2. The data transmission system according to claim 1, wherein said receive buffer means of each node has plural unit capacity memories each having a unit capacity corresponding to an amount of data transmitted in a data frame, and said DMA control means and said receive and transmission control processing means alternately cause storing in respective of said unit capacity memories at respective updated addresses new predetermined received data of a presently received data frame, latest predetermined received data received in the preceding data frame, and one or both of valid predetermined received data received in a past data frame and valid predetermined received data in a next data frame after said past data frame.

3. The data transmission system according to claim 1, wherein said receive and transmission control processing means of each node comprises means for detecting an abnormality in the predetermined received data of a presently received data frame, and upon detecting of an abnormality, means for controlling said receive buffer means so that the predetermined received data of the preceding data frame or said valid predetermined received data received in the past is transferred to a unit capacity memory which otherwise would receive new predetermined received data of a presently received data frame if no abnormality were detected.

4. The data transmission system according to claim 2, wherein in each node said receive and transmission control processing means comprises means for detecting an abnormality in the predetermined received data of a presently received data frame, and upon detecting an abnormality, means for controlling said receive buffer means so way that predetermined received data of the preceding data frame or said valid predetermined received data received in the past is transferred to a unit capacity memory which otherwise would receive new predetermined received data of a presently received data frame if no abnormality were detected.

5. A data transmission system according to claim 1, wherein in each node said address conversion memory means includes an upper address generating memory and a lower address generating memory, a content of said upper address generating memory is updated using the respective corresponding address of the predetermined received data stored in said receive buffer means, an address value of said upper address generating memory is combined with an address value of the specific address from the host to access said lower address generating memory, an address carry process is executed by said address conversion memory means, and said conversion address is output from said upper and lower address generating memories.

6. In a received data processing method using media access control of a token-passing type in which multiple nodes each having a respective destination address are connected to a common transmission path and each node transmits data in a respective predetermined period in order in a broadcasting or multicasting manner, and during transmission of data by another node each non-transmitting node receives and stores the data, each non-transmitting node performing the method comprising the steps of:

receiving a data frame;

detecting a destination address included in said received data frame, determining whether or not the detected destination address corresponds to its own respective destination address, and generating a data frame reception end signal when it is determined that a detected destination address corresponds to its own destination address;

extracting predetermined received data and address information corresponding thereto included in said received data frame in response to generating of said data frame reception end signal;

storing said predetermined received data and said corresponding address information in a receive buffer;

generating an updated address based on said stored address information each time a data frame reception end signal is generated;

storing the updated address in an address conversion memory;

converting a specific address, externally input from a host to access said predetermined received data stored in said receive buffer, and said stored updated address into a conversion address of said predetermined received data; and accessing said received data stored in said receive buffer with said conversion address converted in said converting step to read out said predetermined received data stored in said receive buffer at said conversion address.

7. The method according to claim 6, wherein the receive buffer includes plural unit capacity memories each having a unit capacity corresponding to an amount of the predetermined received data to be extracted from a data frame, comprising the step of storing in respective of said unit capacity memories new predetermined received data extracted from a presently received data frame, latest predetermined received data extracted from the preceding data frame, and one or both of valid predetermined received data extracted from a past data frame and valid predetermined received data extracted from a data frame next received after said past data frame.

8. The method according to claim 7, further comprising the steps of detecting an abnormality in the predetermined received data extracted from a presently received data frame, and when an abnormality is detected transferring the predetermined received data extracted from the preceding data frame or said valid predetermined received data extracted in the past data frame to the unit capacity memory corresponding to predetermined received data extracted from the presently received data frame.

9. A received data processing method according to claim 6, wherein said converting step comprises:

providing an upper address generating memory and a lower address generating memory;

updating a content of said upper address generating memory using said updated address;

combining an address value of said upper address generating memory with an address value derived from said specific address to access said lower address generating memory;

performing an address carry process; and outputting said conversion address from said upper and lower address generating memories.

* * * * *